(12) United States Patent
Bontu et al.

(10) Patent No.: US 10,178,596 B2
(45) Date of Patent: **\*Jan. 8, 2019**

(54) METHOD AND APPARATUS FOR HANDOVER IN HETEROGENEOUS CELLULAR NETWORKS

(71) Applicant: BlackBerry Limited, Waterloo (CA)

(72) Inventors: Chandra Sekhar Bontu, Nepean (CA); Yi Song, Plano, TX (US); Zhijun Cai, Ashburn, VA (US)

(73) Assignee: BlackBerry Limited, Waterloo, Ontario (CA)

( \* ) Notice: Subject to any disclaimer, the term of this patent is extended or adjusted under 35 U.S.C. 154(b) by 100 days.

This patent is subject to a terminal disclaimer.

(21) Appl. No.: 15/092,274

(22) Filed: Apr. 6, 2016

(65) Prior Publication Data

US 2016/0219484 A1 Jul. 28, 2016

Related U.S. Application Data

(63) Continuation of application No. 14/052,324, filed on Oct. 11, 2013, now Pat. No. 9,313,698.

(51) Int. Cl.
*H04W 36/24* (2009.01)
*H04W 36/00* (2009.01)
(Continued)

(52) U.S. Cl.
CPC ....... *H04W 36/24* (2013.01); *H04W 36/0072* (2013.01); *H04W 56/0045* (2013.01);
(Continued)

(58) Field of Classification Search
CPC ............... H04W 36/24; H04W 72/042; H04W 56/0045; H04W 36/0072; H04W 36/0088;
(Continued)

(56) References Cited

U.S. PATENT DOCUMENTS 7,613,148 B2 11/2009 Hong
7,865,209 B2 1/2011 Kim
(Continued)

FOREIGN PATENT DOCUMENTS

CN 201550284 U 8/2010
CN 103220731 A 7/2013
(Continued)

OTHER PUBLICATIONS

Office Action issued in KR Application No. 519981071697 dated Feb. 13, 2016; 8 pages.
(Continued)

*Primary Examiner* — Brian T O Connor
(74) *Attorney, Agent, or Firm* — Fish & Richardson P.C.

(57) ABSTRACT

A method at a user equipment for handover from a serving cell to a target cell, the method sending a measurement report to the serving cell; and transmitting a reconfiguration complete message to the target cell; wherein the measurement report includes downlink timing measurements for the target cell. Further, a method at a source network element for handover of a user equipment from the source network element to a target network element, the method receiving a measurement report from the user equipment; sending a handover request to the target network element; receiving a handover request acknowledgement from the target network element, the handover request acknowledgement including a reconfiguration message and at least one downlink subframe in which an uplink grant is expected at the target network element for the user equipment; and forwarding the reconfiguration message and at least one downlink subframe to the user equipment.

15 Claims, 11 Drawing Sheets

US 10,178,596 B2
Page 2

(51) Int. Cl.
*H04W 56/00* (2009.01)
*H04W 72/04* (2009.01)
*H04W 36/08* (2009.01)
*H04W 72/14* (2009.01)
*H04W 76/19* (2018.01)

(52) U.S. Cl.
CPC ...... *H04W 72/042* (2013.01); *H04W 36/0088* (2013.01); *H04W 36/08* (2013.01); *H04W 56/003* (2013.01); *H04W 72/0446* (2013.01); *H04W 72/14* (2013.01); *H04W 76/19* (2018.02)

(58) Field of Classification Search
CPC ... H04W 36/08; H04W 76/028; H04W 72/14; H04W 72/0446; H04W 56/003
See application file for complete search history.

(56) References Cited

U.S. PATENT DOCUMENTS

| | | | |
|---|---|---|---|
| 7,953,049 B2 | 5/2011 | Nilsson | |
| 7,957,329 B2 | 6/2011 | Ahn | |
| 8,331,326 B2 | 12/2012 | Wang | |
| 8,811,350 B2 * | 8/2014 | Chung | H04J 11/0093 370/332 |
| 8,873,505 B2 * | 10/2014 | Zhang | H04L 5/0035 370/331 |
| 8,976,780 B2 * | 3/2015 | Cai | H04W 56/0045 370/216 |
| 9,008,050 B2 * | 4/2015 | Feuersanger | H04W 52/281 370/336 |
| 9,167,547 B2 * | 10/2015 | Suzuki | H04W 56/0005 |
| 9,282,493 B2 * | 3/2016 | Ahluwalia | H04W 36/02 |
| 9,313,698 B2 * | 4/2016 | Bontu | H04W 36/0072 |
| 9,344,985 B2 * | 5/2016 | Loehr | H04W 56/0005 |
| 9,363,719 B2 * | 6/2016 | Ahluwalia | H04W 36/0072 |
| 9,402,255 B2 * | 7/2016 | Lohr | H04W 72/0446 |
| 9,554,397 B2 * | 1/2017 | Cai | H04W 72/14 |
| 9,674,740 B2 * | 6/2017 | Masini | H04W 36/0083 |
| 9,756,531 B2 * | 9/2017 | Park | H04W 36/00 |
| 9,918,262 B2 * | 3/2018 | Xu | H04W 36/04 |
| 2007/0293224 A1 | 12/2007 | Wang et al. | |
| 2012/0002643 A1 | 1/2012 | Chung et al. | |
| 2014/0029586 A1 | 1/2014 | Loehr et al. | |
| 2014/0362832 A1 | 12/2014 | Rudolf et al. | |
| 2014/0376422 A1 | 12/2014 | Dai et al. | |
| 2015/0023229 A1 | 1/2015 | Yin et al. | |
| 2015/0304911 A1 * | 10/2015 | Wang | H04W 36/0088 370/331 |
| 2015/0323644 A9 | 11/2015 | Lee | |
| 2016/0165499 A1 * | 6/2016 | Xu | H04W 36/02 370/331 |
| 2016/0295613 A1 * | 10/2016 | Wager | H04L 41/0813 |
| 2016/0353511 A1 * | 12/2016 | Gunnarsson | H04W 76/028 |

FOREIGN PATENT DOCUMENTS

| | | |
|---|---|---|
| KR | 10-2005-0116497 | 12/2005 |
| KR | 10-2007-0120988 | 12/2007 |
| KR | 10-2009-0003754 | 1/2009 |
| KR | 10-2009-0017638 | 2/2009 |
| KR | 10-2010-0126808 | 12/2010 |

OTHER PUBLICATIONS

International Search Report dated Dec. 29, 2014 in PCT patent application No. PCT/US2014/056612.
3GPP TS 136.300, "Evolved Universal Terrestrial Radio Access (E-UTRA) and Evolved Universal Terrestrial Radio Access Network (E-UTRAN)," Overall description; Stage 2, V.10.5.0 Release 10, Nov. 2011.
3GPP TS 36.331, "Evolved Universal Terrestrial Radio Access (E-UTRA); Radio Resource Control (RRC)," Protocol specification; V. 10.3.0 Release 10, Nov. 2011.
International Application No. PCT/CN2013/080319; filed Jul. 29, 2013.
U.S. Appl. No. 13/745,051, filed Jan. 18, 2013.
U.S. Appl. No. 13/856,969, filed Apr. 4, 2013.
U.S. Appl. No. 14/033,256, filed Sep. 20, 2013.
U.S. Appl. No. 13/895,037, filed May 15, 2013.
Office Action issued in Chinese Application No. 201480002161.2 dated Oct. 17, 2017; 8 pages.

* cited by examiner

METHOD AND APPARATUS FOR HANDOVER IN HETEROGENEOUS CELLULAR NETWORKS

CROSS REFERENCE TO RELATED APPLICATION

This patent is a continuation of U.S. application Ser. No. 14/052,324, filed Oct. 11, 2013, the entire contents of which is hereby expressly incorporated by reference herein in its entirety.

FIELD OF THE DISCLOSURE

The present disclosure relates to heterogeneous networks and in particular relates to handover in heterogeneous network.

BACKGROUND

Low power cells, such as femto cells or pico cells, form part of a heterogeneous network and are being deployed within macro cells in order to increase data throughput and provide better coverage at the cell edge of the macro cell. Such low power cells are typically deployed in an unplanned manner with regard to the macro cell and a macro cell may have a large number of the low-powered cells in a clustered cell deployment.

In such a clustered cell deployment, a user equipment (UE) may experience multiple handovers while traversing through the macro cell coverage area. Such handovers may result in data interruption and/or additional packet delay for each handover. The data interruption and additional packet delays, especially when occurring multiple times, may result in a poor user experience.

BRIEF DESCRIPTION OF THE DRAWINGS

The present disclosure will be better understood with reference to the drawings, in which.

DETAILED DESCRIPTION OF THE DRAWINGS

Figure 1:
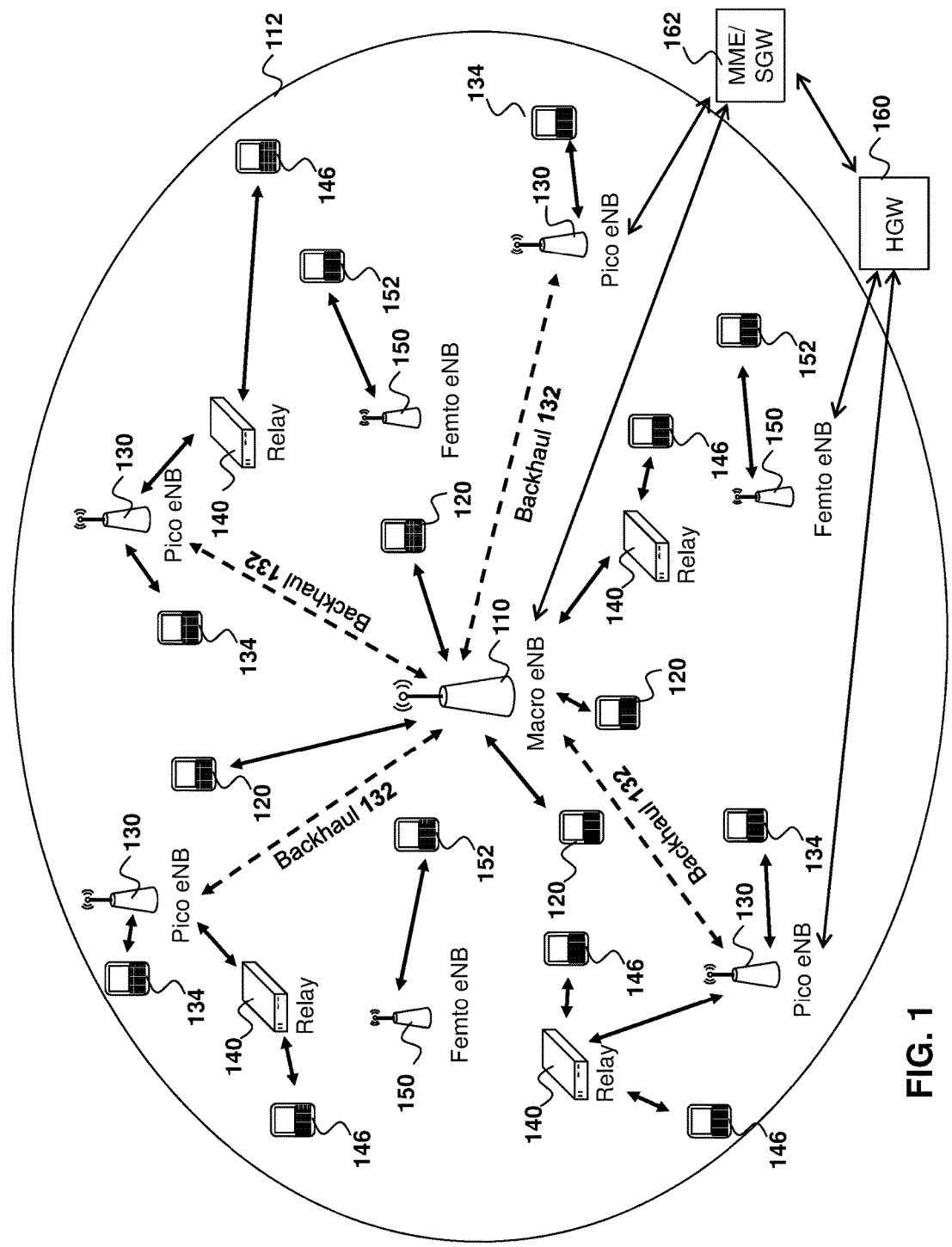
FIG. 1 is a block diagram showing an example macro cell with a variety of small cells therein.

The present disclosure provides a method at a user equipment for handover from a serving cell to a target cell, the method comprising: sending a measurement report to the serving cell; and transmitting a reconfiguration complete message to the target cell; wherein the measurement report includes downlink timing measurements for the target cell.

The present disclosure further provides a user equipment adapted for handover from a serving cell to a target cell, the user equipment comprising a processor configured to: send a measurement report to the serving cell; and transmit a reconfiguration complete message to the target cell; wherein the measurement report includes downlink timing measurements for the target cell.

The present disclosure further provides method at a source network element for handover of a user equipment from the source network element to a target network element, the method comprising: receiving a measurement report from the user equipment; sending a handover request to the target network element, the handover request including a request for an uplink grant at the target network element for the user equipment to send a reconfiguration complete message; receiving a handover request acknowledgement including a reconfiguration message and the uplink grant; and forwarding the reconfiguration message and uplink grant to the user equipment.

The present disclosure further provides a source network element for handover of a user equipment from the source network element to a target network element, the source network element comprising a processor configured to: receive a measurement report from the user equipment; sending a handover request to the target network element, the handover request including a request for an uplink grant at the target network element for the user equipment to send a reconfiguration complete message; receive a handover request acknowledgement including a reconfiguration message and the uplink grant; and forward the reconfiguration message and uplink grant to the user equipment.

The present disclosure further provides a method at a source network element for handover of a user equipment from the source network element to a target network element, the method comprising: receiving a measurement report from the user equipment; sending a handover request to the target network element; receiving a handover request acknowledgement from the target network element, the handover request acknowledgement including a reconfiguration message and at least one downlink subframe in which an uplink grant is expected at the target network element for the user equipment; and forwarding the reconfiguration message and at least one downlink subframe to the user equipment.

The present disclosure further provides a source network element for handover of a user equipment from the source network element to a target network element, the source user equipment comprising a processor configured to: receive a measurement report from the user equipment; send a handover request to the target network element; receive a handover request acknowledgement from the target network element, the handover request acknowledgement including a reconfiguration message and at least one downlink subframe in which an uplink grant is expected at the target network element for the user equipment; and forward the reconfiguration message and at least one downlink subframe to the user equipment.

Reference is now made to FIG. 1, which shows an example of a dense Third Generation Partnership Project (3GPP) Long Term Evolution (LTE)-Advanced (LTE-A) heterogeneous network deployment scenario. Such deployment may be used to increase capacity and enhance coverage of a macro cell, for example.

While the disclosure below uses the 3GPP LTE radio access technology (RAT), such RAT is provided for illustrative purposes only, and the present disclosure could equally be used with other network infrastructures.

Capacity increase allows for more data transfer within a network. Data capacity requirements increase significantly over time, and may require doubling the data capacity every year. Some forecasts see a 1000 times capacity increase demand in cellular networks by the year 2020.

Further, coverage issues at cell edges of traditional macro cells are always a bottleneck for both downlink and the uplink.

One possible technique to resolve coverage and capacity issues is the deployment of a heterogeneous network where small cells such as pico cells, femto cells and relays may enhance both the network throughput and the cell edge coverage. In particular, referring to FIG. 1, a macro evolved Node B (eNB) 110 has a coverage area 112.

Some UEs, shown as UEs 120, communicate directly with macro eNB 110. However, in order to offload some UEs from macro eNB 110, small cells are introduced within macro cell coverage area 112.

In particular, in the example of FIG. 1, pico cells 130 provide small cell coverage. Pico cells 130 may be located near the cell edge or may be located in high density or high usage areas to offload some data traffic to the pico cells.

In the embodiment of FIG. 1, pico cells 130 include a backhaul 132 such as a fiber or microwave backhaul, for example, between macro eNB 110 and the pico eNB. UEs 134 communicate directly with pico cells 130. The backhaul could be wireless or wire line.

In other cases, a relay 140 may be connected to either macro eNB 110 or to a pico eNB 130. As will be appreciated, relays provide enhanced coverage area or enhanced throughput for UEs 146 connected to them.

In other embodiments, femto cells 150 may be located within the macro cell coverage area 112 and be connected to UEs 152.

As seen in FIG. 1, some of the small cells may communicate with a Home eNB Gateway (HGW) 160 or with an mobility management entity/serving gateway (MME/SGW) 162. Further, HGW 160 communicates with MME/SGW 162.

Based on FIG. 1 above, a heterogeneous network is a network which, in some embodiments, is designed to provide uniform coverage or capacity to serve a non-uniform distribution of users and needs. It includes the macro cells and the low-power nodes such as pico cells, femto cells, and relays. The macro cells overlay the low power nodes or small cells, sharing the same frequency or having different frequencies. Small cells are utilized to offload capacity from macro cells, improve indoor and cell edge performance, among other functionalities. Heterogeneous networks may also include a first cell using a first radio access technology (RAT) and a second cell using a second radio access technology (RAT), where the first RAT is different than the second RAT.

The pico cells and macro cells from FIG. 1 above are connected to the evolved packet core (EPC) and S1 interface. Femto cells or small cells may be connected through an intermediate gateway, home eNB gateway (HGW) 160. The functionality of the various entities is well described in the 3$^{rd}$ Generation Partnership Project Technical Specification 36.300, *"Evolved Universal Terrestrial Radio Access (E-UTRA) and Evolved Universal Terrestrial Radio Access Network (E-UTRAN); Overall description; Stage 2"*, v. 11.7.0, September 2013, the contents of which are incorporated herein by reference. In such deployments, the UE may experience multiple handovers while traversing through the macro cell coverage area.

Figure 2:
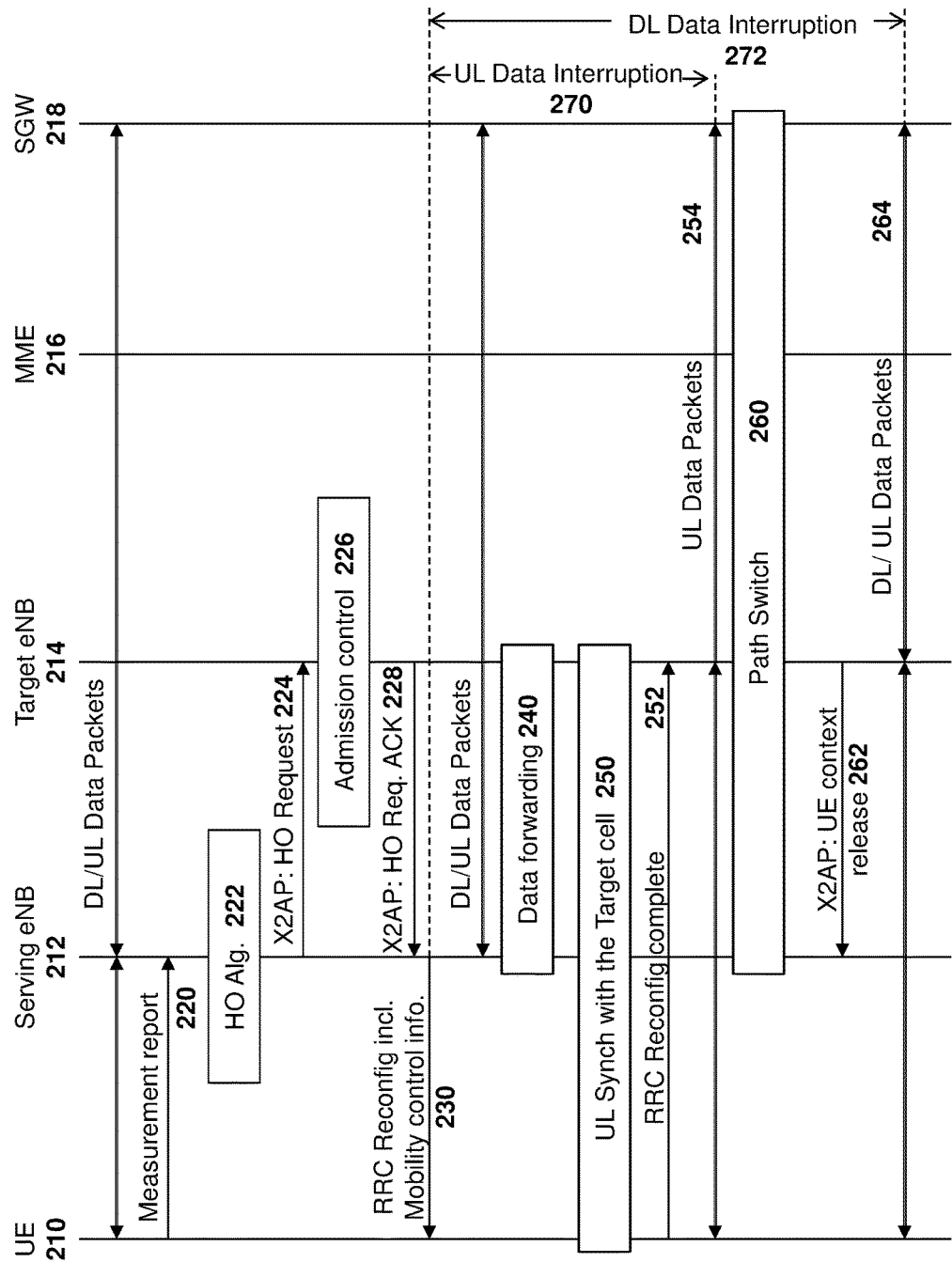
FIG. 2 is a data flow diagram showing handover of a user equipment from a serving cell to a target cell.

Reference is now made to FIG. 2, which shows existing procedures for handovers in a Long Term Evolution Architecture.

As seen in FIG. 2, a UE 210 communicates with a serving eNB 212. As used herein, the serving eNB of the UE is the eNB whose associated cell is actively communicating with the UE. Furthermore, the serving eNB is the global system for mobile communications (GSM) packet radio service (GPRS) tunnelling protocol (GTP) endpoint for the data and control path associated with the UE from the EPC.

UE 210 may further communicate with a target eNB 214. As used herein, a target or new serving eNB is an eNB for which the associated cell is determined to be better as a serving cell for future data or control transactions. The data or control paths associated with the UE are switched from the current serving eNB to the new serving eNB when the UE indicates successful association with a cell associated with the new serving eNB.

Serving eNB 212 and target eNB 214 may communicate with a mobility management entity (MME) 216 and may further communicate with a serving gateway 218.

As seen in FIG. 2, UE 210 initially is served by serving eNB 212 and receives downlink data packets that are transmitted from the serving gateway 218 through serving eNB 212. Further uplink packets are sent from the UE 210 to serving eNB 212, which then passes the uplink data packets through serving gateway 218 to a public data subscriber network (for example, the internet).

UE 210 may be triggered to send a measurement report, as shown by message 220, by rules, for example set out in system information, in radio resource control (RRC) messages, among the technical specifications, or in other locations. If such a rule is triggered, the UE 210 sends measurement report 220 to serving eNB 212. For example, the measurement report may be triggered when the signal quality with respect to the serving cell is lower than a specified threshold. In another example, the measurement report may be triggered when the difference of signal quality with respect to the serving cell and another neighbour cell is lower than a threshold for a specified time.

Serving eNB 212 receives the measurement report 220 and the serving eNB 212 may then make a handover decision. Such a handover decision may include selecting an appropriate target cell based on the measurement report received in message 220 from UE 212 to initiate a handover. The determination is shown by block 222.

In the example of FIG. 2, serving eNB 212 decides that handover is required to target eNB 214. In this regard, the serving eNB 212 sends a message to target eNB 214. Message 224 may be sent over a backhaul interface, for example, an X2 interface. In particular, an X2AP: HANDOVER REQUEST message 224 may be sent to the target eNB 214 passing necessary information in order to prepare for the handover at the target cell. In the embodiment of FIG. 2, it is assumed that the target cell and the source cell belong to different eNBs. In one embodiment, the term cell is used to indicate a radio equipment supporting one protocol stack. In one embodiment, one eNB may consist of many cells.

Target eNB 214 may then perform admission control, as shown by block 226. Such admission control is dependent on the received evolved-universal terrestrial radio access network (E-UTRAN) radio access bearer (E-RAB) quality of service information to increase the likelihood of a successful handover, if resources can be granted by the target cell. The target cell configures the required resources according to the received E-RAB quality of service information and reserves a cell radio network temporary identifier (C-RNTI) and optionally a radio access channel (RACH) preamble.

The access link configuration used by the target cell can either be specified independently, for example an "establishment", or as a delta compared to the access link configuration used in a source cell, for example a "reconfiguration". The link configuration includes, for example, a transmit power level and a coding and modulation scheme to use.

Based on the admission control at block 226, the target eNB 214 prepares for handover and sends an X2AP: HANDOVER REQUEST ACKNOWLEGEMENT message 228 back to serving eNB 212. Message 228 includes a transparent container that is to be sent to the UE as a radio resource control (RRC) message to perform the handover. The contents of a transparent container are transferred unaltered from the serving eNB to the UE. The container includes the new C-RNTI, target eNB security algorithm identifiers for the selected security algorithms, and may include a dedicated RACH preamble and possibly other parameters. Such other parameters, for example, may include access parameters, system information blocks (SIBs), among others. The X2AP: HANDOVER REQUEST ACKNOWLEDGEMENT message 228 may also include radio network layer (RNL)/transport network layer (TNL) information for the forwarding tunnels, if necessary.

Target eNB 214 generates the RRC message to perform the handover, for example an RRCConnectionReconfiguration message which includes the mobilityControlInformation, to be sent by source eNB 212 towards UE 210 in the transparent container.

Once serving eNB 212 receives message 228, it sends the RRC reconfiguration message to the UE with some of the information received in message 228, as shown by message 230. At this point, serving eNB 212 still receives downlink packets from the serving gateway 218 and the serving eNB 212 starts transmitting the unacknowledged data packets to the target eNB 214 over the X2_U interface, as shown by block 240.

After receiving the RRCConnectionReconfiguration message 230 at UE 210, including the mobility control information, the UE 210 performs synchronization to target eNB 214 and accesses the target cell via RACH, following a contention-free procedure if a dedicated RACH preamble was indicated in mobilityControlInformation, or following a contention-based procedure if no dedicated preamble was indicated.

UE 210 derives target eNB 214 specific keys and configures the selected security algorithms to be used in the target cell. The target eNB 214 responds with uplink allocation and timing advance. The synchronization is shown in the example of FIG. 2 by block 250.

When UE 210 has successfully accessed the target cell, the UE sends an RRC Connection Reconfiguration Complete message to confirm the handover, along with an uplink Buffer Status Report, whenever possible, to the target eNB 214 to indicate that the handover procedure is completed for the UE 210. Target eNB 214 verifies the C-RNTI sent in the RRC Connection Reconfiguration Complete message 252.

As shown by arrows 254, uplink data packets are then forwarded through target eNB 214 to the Serving Gateway 218.

Target eNB 214 sends an S1AP: PATH SWITCH message to MME 216 to inform that the UE has changed cells. MME 216 sends an UPDATE USER PLANE REQUEST message to the Serving Gateway 218. The Serving Gateway then switches the downlink data path to the target eNB 214. The Serving Gateway sends one or more end marker packets on the old path to source eNB 212 and then can release any user plane or TNL resources towards the source eNB 212. For example, end marker packets can indicate the end of a transmission.

Serving Gateway 218 sends an UPDATE USER PLANE RESPONSE message to MME 216 and MME 216 confirms the S1AP: PATH SWITCH message with the PATH SWITCH ACKNOWLEDGE message. The target eNB 214 starts making the scheduled decisions on the new packets received from this point. All of this is shown with regard to the PATH SWITCH block 260.

By sending an X2AP: UE CONTEXT RELEASE message 262, the target eNB 214 informs the success of the handover to the source eNB 212. In one embodiment, a successful handover message indicates that the uplink and downlink paths have been switched from the serving eNB to the target eNB. Target eNB 214 sends this message after the S1AP: PATH SWITCH ACKNOWLEDGE message is received from the MME 216. At this point, as shown by arrows 264, the eNB 214 is now the serving eNB and uplink and downlink packets are sent to UE 210 through target eNB 214.

Typically, data interruption during a handover is indicated in FIG. 2 by arrow 270 for uplink data interruption and arrow 272 for downlink data interruption. Normally, the data interruption times for uplink and downlink data streams are different, as illustrated.

As outlined above with regard to block 250 of FIG. 2, UE 210 performs uplink synchronization to the target cell by transmitting a RACH preamble, following a contention-free procedure if a dedicated RACH preamble was indicated in the mobilityControlInformation, or following a contention-based procedure if no dedicated preamble was indicated.

Figure 3:
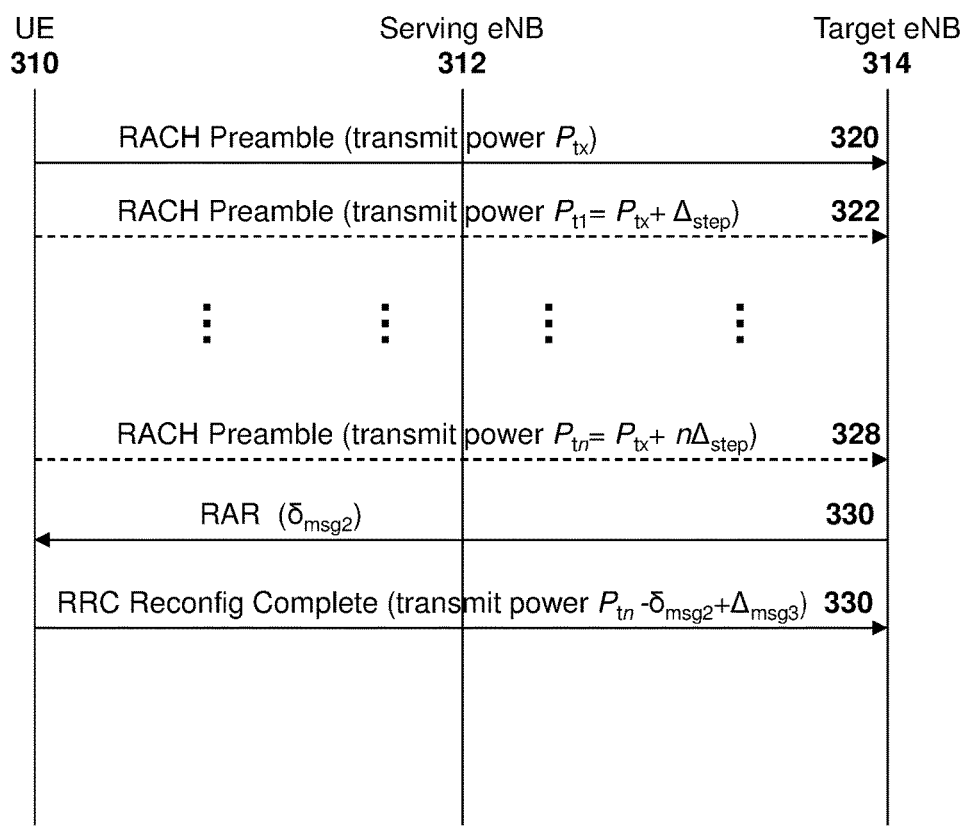
FIG. 3 is a data flow diagram showing uplink synchronization between a user equipment and a target cell.

The target eNB 214 responds with uplink allocation and timing advance during this uplink synchronization, as for example, shown in FIG. 3.

In particular, in FIG. 3, UE 310 communicates with a target eNB 314. Source eNB 312 is also shown since the process is part of block 250 of FIG. 2.

UE 310 sends the RACH preamble to target eNB 314 in message 320, message 320 having a transmit power $P_{tx}$.

If no response is received, the UE will continue to send the RACH preambles with increased transmit power. For example, in message 322, the RACH preamble is sent with a transmit power $P_{tx1} = P_{tx} + \Delta_{step}$.

At some point, the transmit power $P_{txn} = P_{tx} + n\Delta_{step}$ is sent to target eNB 314 in message 328, where it is successfully decoded and a message 330 is provided back to UE 310. Message 330 is a random access response and includes a transmit power which is then used to provide the RRCReconfigurationComplete message 340 to the target eNB 314. In particular, the transmit power is set to the power received in message 330 plus a delta value, shown as $\Delta_{msg3}$.

The procedure of FIG. 3 is basically used to achieve synchronization with a target cell and to obtain the uplink grant to send the RRCReconfigurationComplete message to conclude a successful handover. Such successful handover subsequently triggers the data path switch to the target eNB 314.

However, in a typical heterogeneous cell deployment, low power cells, such as pico cells, femto cells and relay nodes are deployed as an overlay to the existing planned heterogeneous deployments. Normally the overlay deployment is done in an unplanned manner and is intended to meet the demand for ever-increasing mobile data applications or to improve the coverage of the macro cell. In such deployment scenarios, the handover cost is applied to a mobile device or UE moving across the macro cell and it would be beneficial to reduce the handover cost. Typically the handover cost is measured in the data interruption time or packet delays that an end user experiences due to the handover.

In this regard, the present disclosure provides for the reduction in handover data interruption and packet delay. In particular, in accordance with the present embodiments, when the UE is moving in a heterogeneous deployment or a dense deployment, often the uplink synchronization performed at a target cell may be skipped by the UE if the UE is capable of measuring the downlink difference of time of arrival (TOA) between the target and serving cells.

In one embodiment, the target cell may also arrange uplink resources for the incoming user equipment beforehand.

In accordance with the embodiments described below, the subframe timing at the serving cells and target cells is aligned. In this regard, the delays in receipt of data packets at the UE for downlink transfers are based on propagation delay.

Figure 4:
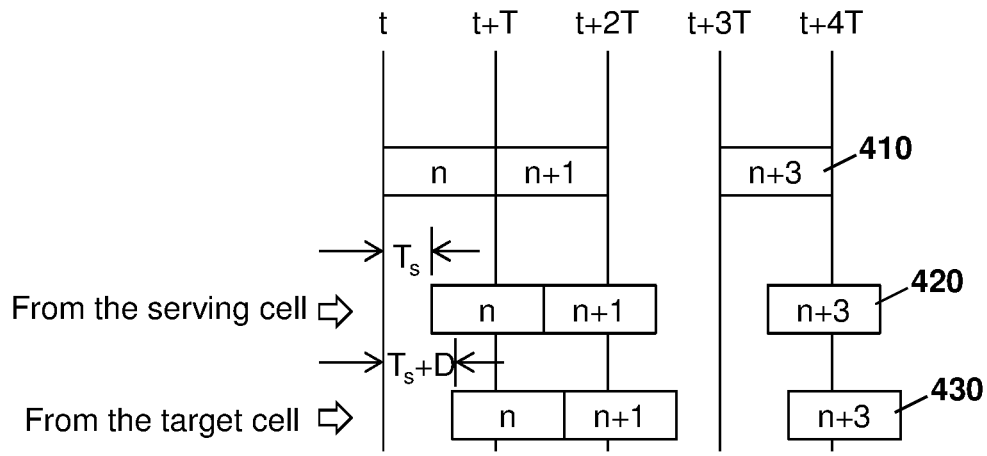
FIG. 4 is a timing diagram showing downlink reception at a user equipment from a serving cell and a target cell.

In particular, reference is made to FIG. 4, which shows a timing diagram in which timing of the serving and target cells is shown with regard to reference 410. This figure shows what would be seen by an omniscient observer of the transmitting serving cell, the transmitting target cell, and the reception of those two transmissions at the UE. The cells are synched on downlink, so the subframe with label n represents both the transmission from the serving and target cells. The next line down in the figure shows reception at the UE of the serving cell transmission. The last line shows reception at the UE of the target cell transmission. In particular, each subframe has a duration time T and thus the subframes are transmitted at a time t+nT.

The UE may receive the nth subframe as shown by reference 420 at a time $t+nT+T_s$, where $T_s$ is a one way propagation delay between the serving cell and the UE.

Similarly, as shown by reference 430, the UE may receive the nth subframe from the target cell at a time $T+nT+T_t$, where $T_t$ is a one way propagation delay between the target cell and the UE. In one embodiment, the time $T_t$ can be expressed as $T_s+D$, where D may be positive or negative.

Figure 5:
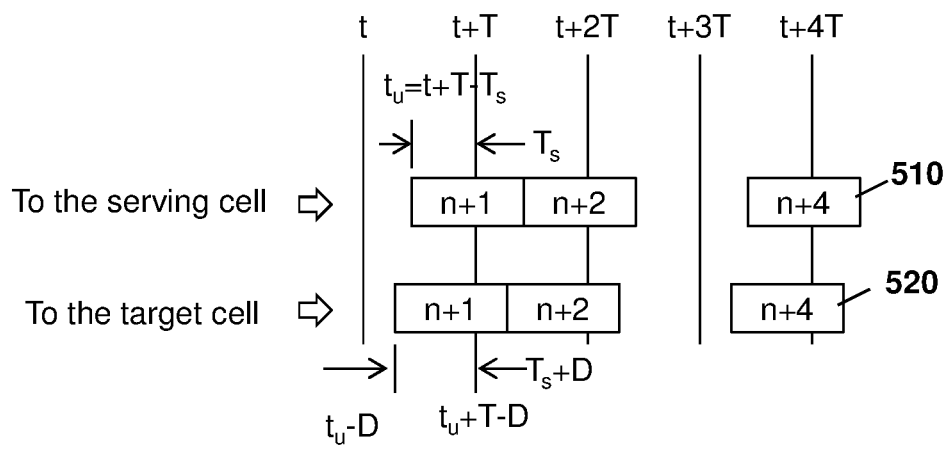
FIG. 5 is a timing diagram showing uplink transmission offset for transmitting to a serving cell and a target cell.

If uplink and downlink reciprocity is assumed, the transmission time from the UE may be based on the received times and propagation delays shown in FIG. 4. In particular, reference is now made to FIG. 5, which shows uplink transmissions from the UE. In order to transmit to the serving cell, the UE transmits subframes as shown by reference 510. As seen, the transmission time of subframe n+1 is provided as $t_u$, which equals $t+T-T_s$ for transmission to the serving cell. The transmission from the UE at time $t+T-T_s$ will be received at the serving cell at time t+T.

Similarly, the transmission time to the target cell is at a time $t_u-T$, as shown by reference 520. Thus, the UE may be capable of measuring the downlink difference in time of arrival and arrange for the transmissions in the uplink.

Reduction in Handover Data Interruption/Packet Delay

Referring to the steps involved in handover as illustrated in FIG. 2 above, the uplink and downlink packet interruption times 270 and 272 respectively can be reduced by eliminating the uplink synchronization process of block 250 at the target cell.

The UE in this case may adjust its uplink transmit timing by using measurements of the downlink difference in time of arrival of the target cells, referenced to the serving cell. Assuming that the serving cell sets the UE's timing advance (TA) to cancel round trip propagation, the UE can then determine that $Ts=T_A/2$, where $T_s$ is the serving cell propagation delay, and $T_A$ is the timing advance value used by the UE to transmit to the serving cell. Assuming that the serving cell and target cell downlinks are the same frame timing then the UE can determine $T_t$ from downlink measurements. The timing advance that can be used to cancel round trip propagation at the target cell is then $T_{At}=2*T_t$.

The UE may also measure the subframe number offset between the serving and potential target cells. In other words, while the timing may be synchronized for the serving and target cells, the subframe numbers may not be aligned. Thus, the UE can measure the subframe number offset between the two cells.

Further, the subframe number offset may be reported to a UE's serving cell. This information, as well as the timing advance related measurements are known to the UE when it measures the potential target cells, for example, as reported in message 220 of FIG. 2.

If the serving eNB sets the UE timing advanced values to something other than what will cancel round trip propagation, then additional information beyond the UE's timing advance may be needed to determine the cells' frame timings. Assuming that the cells are mutually aware of their timings, the serving eNB could calculate the TA value and the UE should use on the target cell, and signal it to the UE. Since the needed measurements may be part of the neighbor cell measurements in message 220, the $T_{At}$ value may be transmitted as part of the RRC reconfiguration message as described below.

Further, if the cells are sufficiently small and close together, the uplink timing may be relatively close between the target and source cells. Also, the RRC complete message is likely to be transmitted with a relatively robust modulation and coding scheme (MCS) state on the physical uplink shared channel (PUSCH), such that tight synchronization may not be needed for successful reception. Therefore, it may be sufficient for at least the transmission of the RRC complete message to set $T_{At}=T_A$. In other embodiments $T_{At}=0$ may also be feasible.

Timing corrections could then be made later using a successfully received RRC complete message as well as other later transmissions. In one embodiment, fine timing corrections for UE transmissions can be made based on this RRC complete message.

In accordance with one embodiment, the serving cell may request an uplink radio resource grant from the target cell for an incoming UE. This request may be sent to the target cell using a X2AP: HO REQUEST message.

In the X2AP: HO REQUEST ACK message, an uplink grant is specified by the target eNB. This uplink grant is informed to the UE in the mobility control information message by the serving cell. The UE can then move to the target cell and transmit its RRC reconfiguration complete message to the target cell using the allocated uplink resources.

The serving eNB may configure the UE specific measurement report based on UE capabilities. For example, if the UE is capable of measuring a time of arrival from a target cell relative to the time of arrival of the serving cell, the eNB may instruct the UE to send time of arrival measurements in a measurement report. Triggering this new measurement report may also be dependent on the deployment scenarios.

Alternatively, the handover procedure may be predefined based on the UE capabilities. Such UE capabilities may be provided to the network during the network entry of the UE.

Embodiment in which an uplink resource grant is carried in the HO Ack.

Figure 6:
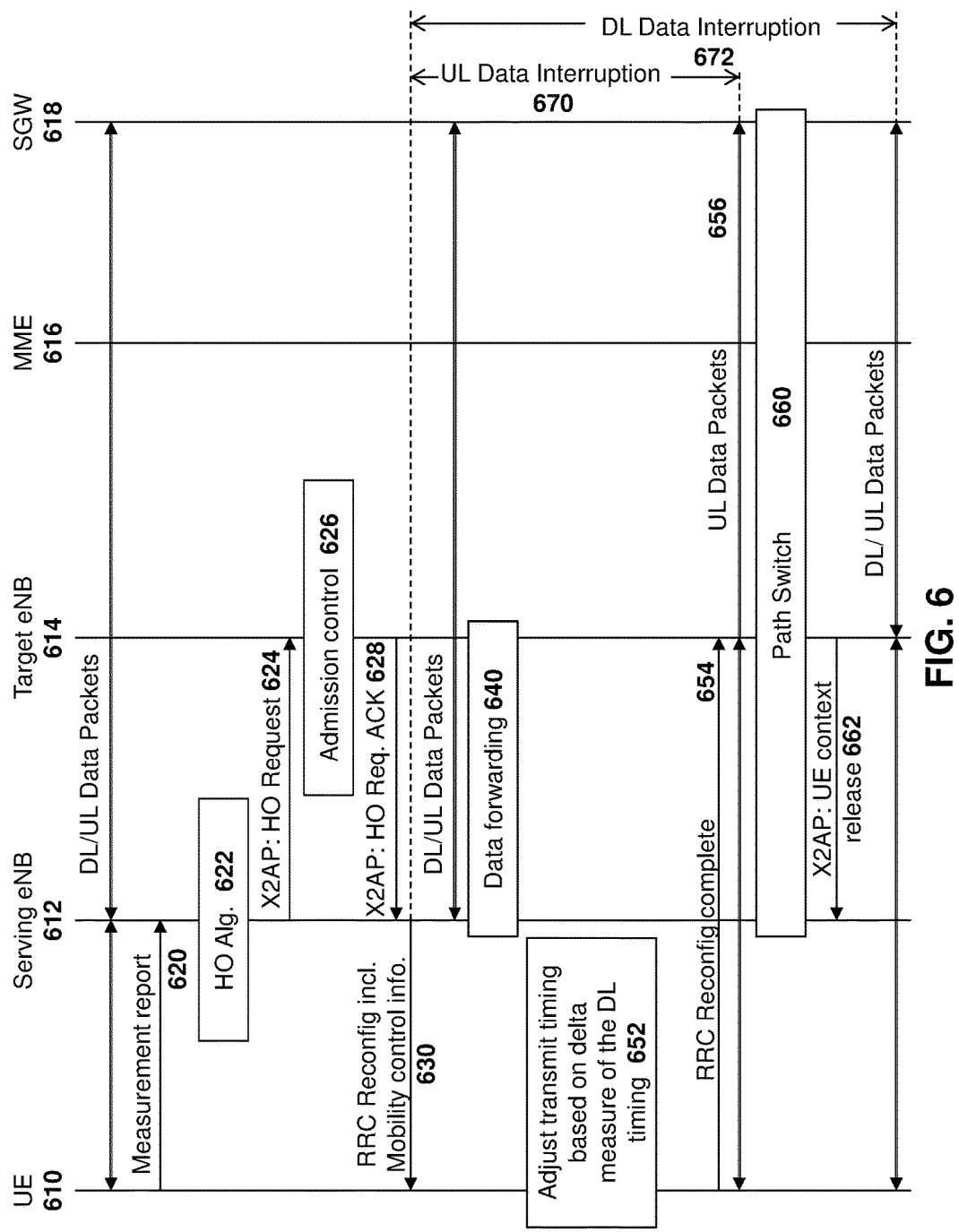
FIG. 6 is a data flow diagram showing handover of a user equipment from a serving cell to a target cell where uplink grant is provided to the user equipment.

Reference is now made to FIG. 6, which shows a handover procedure in accordance with the above. The embodiment of FIG. 6 corresponds with that of FIG. 2, with the exception that the embodiment provides a handover scheme that reduces data interruption times.

In particular, referring to FIG. 6, UE 610 communicates with serving eNB 612 and target eNB 614. The serving eNB 612 and target eNB 614 communicate with MME 616 and with SGW 618.

UE 610 sends a measurement report 620 to the serving eNB 612. As with message 220 of FIG. 2, the measurement report 620 is triggered by rules set down by other system information (as explained in the discussion of FIG. 2) or the technical specifications. Further, in the case of message 620, the measurement report may also include, in some embodiments, downlink timing measurements of a target cell.

At block 622 the serving eNB 612 makes a handover decision. The decision at block 622 is similar to that of block 222 of FIG. 2.

The serving cell in the example of FIG. 6 chooses target eNB 614 and sends a handover request message 624 to the target eNB 614. The handover may include the X2AP: HANDOVER REQUEST message and include necessary information to prepare for a handover at the target cell. However, contrary to the embodiment of FIG. 2, in the embodiment of FIG. 6 the handover request message may include a request for an uplink grant at the target cell for the incoming UE 610 to send the RRCReconfigurationComplete message. The uplink grant includes uplink resource grant for initial transmission and any required subsequent retransmissions. For example, a subsequent retransmission is triggered by a NACK message (a feedback message indicating a packet was received in error).

Target eNB 614 then performs admission control at block 626 similarly to the admission control at block 226 of FIG. 2. However, in the embodiment of FIG. 6, the target cell further prepares for uplink grant from the incoming UE to send the RRCConfigurationComplete message.

Based on the admission control at block 626, the target eNB 614 sends a message 628 back to serving eNB 612. Message 628 may be an X2AP: HANDOVER REQUEST acknowledgement message which may include transparent container to be sent to the UE as an RRC message to perform the handover. Similar to message 228, the handover request acknowledgement may include a new C-RNTI, target eNB security algorithm identifiers for the selected security algorithms, a dedicated RACH preamble, or other parameters. The RRC message that the target eNB 614 generates has mobility control information.

The handover request acknowledgement message further includes an uplink grant at the target cell for the incoming UE to send the RRCConnectionReconfigurationComplete message.

Based on the receipt of message 628, serving eNB 612 provides the RRC Reconfiguration message including the mobility control information to UE 610, as shown by message 630. Message 630 further includes an uplink grant at the target cell for sending RRCConnectionReconfigurationComplete message. In one embodiment, message 630 may also include a timing advance value to use to transmit at least the RRCConnectionReconfigurationComplete message. Further, the uplink grant may use the subframe number at the target cell, which the UE 610 is assumed to know. The UE can use the difference in subframe number (between serving eNB and target eNB) to update the assigned subframe number in the uplink grant.

As seen in FIG. 6, the downlink data packets are then provided to a serving eNB which then provides data forwarding at block 640.

Further, as illustrated in FIG. 6, an uplink synchronization block similar to block 250 of FIG. 2 is not required.

If no uplink grant is received, UE 610 performs the synchronization to the target eNB and accesses the target cell at block 652. The access may be via the random access channel following a contention free procedure if a dedicated RACH preamble was indicated in a mobility control information or following a contention-based procedure if no dedicated preamble or uplink grant was indicated. The UE derives the target eNB specific keys and configures the selected security algorithms to be used on the target cell.

The target eNB 614 responds with an uplink allocation and timing advance. The uplink allocation may contain a subframe number and the timing advance correction to be used by the UE so as to transmit in a way that the target eNB observes the uplink transmission aligned with reception from other UEs. If the mobility control information contains an uplink grant, the UE prepares for transmitting the RRCConnectionReconfiguration message during the specified uplink subframe by adjusting its uplink transmit timing based on the downlink reception timing from the serving and the target cells.

When the UE has successfully accessed the target cell, or if an uplink grant is received, the UE then sends an RRCConnectionReconfigurationComplete message (C-RNTI) 654 to configure the handover, along with an uplink buffer status report, whenever possible, to target eNB 614 to indicate that the handover procedure is completed for UE 610. Target eNB 614 verifies the C-RNTI sent in the RRCConnectionReconfigurationComplete message 654.

At this point, as shown by arrow 656, uplink data packets may be sent through target eNB 614 and passed to the SGW 618.

The target eNB may then perform a path switch, as shown at block 660. Block 660 is similar to block 260 in FIG. 2 above.

Target eNB 614 may then send a X2AP: UE CONTEXT RELEASE to the serving eNB 612, as shown by message 662. At this point, target eNB 614 becomes the serving eNB and all communications for both uplink and downlink are sent through target eNB 614.

Based on the above, the time for both uplink data interruption 670 and downlink data interruption 672 is reduced through the removal of block 250.

Figure 7:
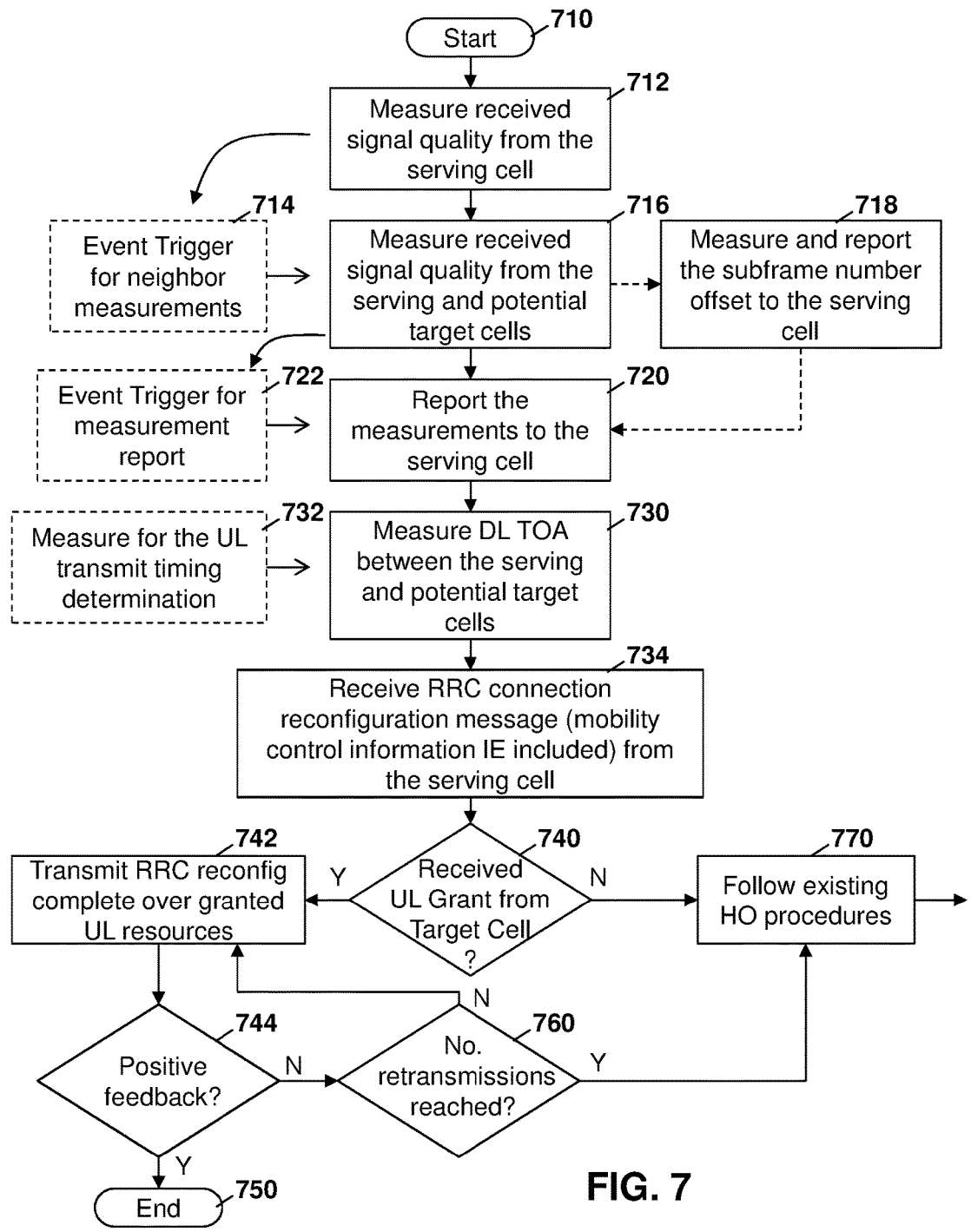
FIG. 7 is a process diagram showing a process at a user equipment for handover to a target cell in accordance with the embodiment of FIG. 6.

Reference is now made to FIG. 7, which illustrates the functionality of the UE according to the above embodiment. When the UE receives the uplink grant in the RRCConnectionReconfiguration message from the serving cell, the UE may transmit the RRCConnectionReconfigurationComplete message during those assigned uplink resources to the target cell. If there is no positive acknowledgement for the RRCConnectionReconfigurationComplete message transmission, and if retransmissions are exhausted, the UE may initiate the RACH procedure with the target cell. In one embodiment, the mobility control information element (IE)

in the RRCConnectionReconfiguration message may include a RACH preamble sequence assignment along with the uplink grant.

Referring to FIG. 7, the process starts at block 710 and proceeds to block 712 in which the received signal quality from the serving cell is measured. As indicated by the dotted block 714, this may trigger neighbor cell measurements and in this case proceeds to block 716 in which the UE measures received signal quality from the serving cell and potential target cells.

From block 716, the process may optionally proceed to block 718 in which the UE measures and reports the subframe number offset of the neighboring cells to the serving cell.

From block 716, if block 718 is not used, or from block 718, the process proceeds to block 720 in which the measurement report is reported to the serving cell. As seen in FIG. 7, the measurements of the potential target cells is the trigger, as shown by block 722, in order to send the measurement report.

Upon sending the measurement report, the process proceeds from block 720 to block 730 in which the difference in downlink time of arrival between the serving and the potential target cells is measured. Further, as seen in FIG. 7, a determination for the uplink transmit timing determination may be also made as shown by block 732 based on the difference of TOA measurements made on the downlink (DL).

After measuring the time difference of arrival, the process then proceeds from block 730 to block 734 in which the RRCConnectionReconfiguration message with the mobility control information element included is received from the serving cell.

The process then proceeds to block 740 in which a check is made to determine whether or not an uplink grant was received from the target cell. If yes, the process proceeds to block 742 in which the RRC Reconfiguration Complete Message (message 654 of FIG. 6) is transmitted over the granted uplink resources and the process then proceeds to block 744.

At block 744 a check is made to determine whether a positive acknowledgement has been received for the message of block 742. If yes, the process proceeds to block 750 and ends. At this point, on the network side the path switch of block 660 from FIG. 6 occurs. However, from the UE perspective the transfer is complete and the target eNB now becomes the serving eNB.

Conversely, if at block 744 it is determined that a positive acknowledgement has not been received the process then proceeds to block 760 in which a check to determine whether or not a maximum number of retransmissions is exhausted. If no, the process then proceeds back to block 742 in which the RRC Reconfiguration Complete Message is retransmitted with a higher transmit power.

From block 740, if an uplink grant was not received, or from block 760 if the maximum number of retransmissions is reached, the process proceeds to block 770 in which an existing handover procedure, such as that illustrated in FIG. 2, is followed.

In an alternative embodiment, the serving cell may request the target cell to assign the uplink grant for the incoming UE to send the RRCReconfigurationComplete message to the target cell. In this embodiment, the target cell may indicate the subframe which is carrying the physical downlink control channel (PDCCH) for the uplink grant. The UE may then receive a PDCCH with the allotted C-RNTI in the allotted subframe. The UE can then transmit the RRCReconfigurationComplete message in subsequent subframes.

The transmission timing may be adjusted based on the downlink timing between the serving and target cells.

Alternatively, the serving cell may instruct the UE to look for the uplink grant via PDCCH from the target cell until a preconfigured or predetermined timer expires. Once this timer expires, the UE may revert back to the procedure described above with regard to FIG. 2. The timer may be started by the UE when the RRCConnectionReconfiguration message is received from the serving cell.

Figure 8:
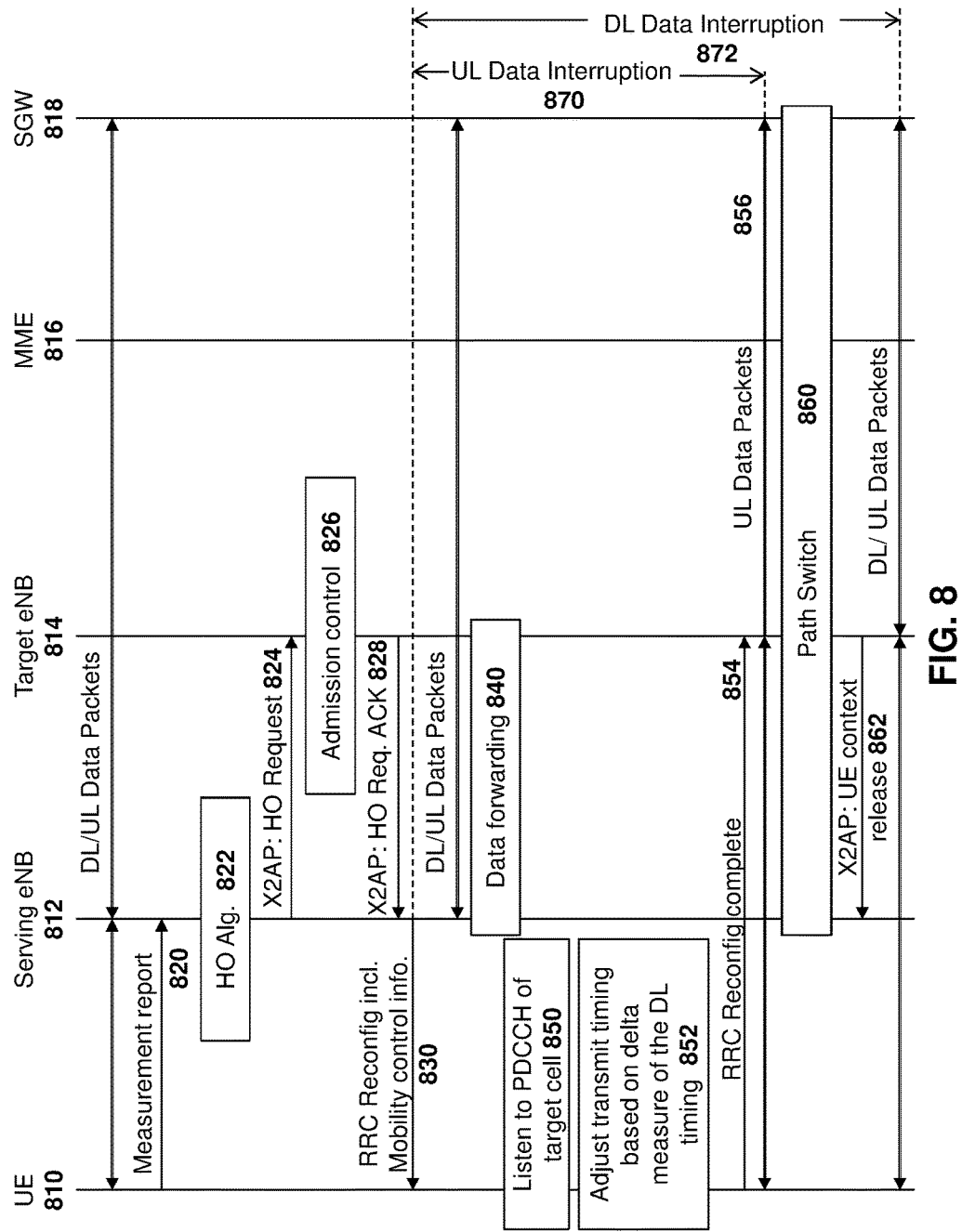
FIG. 8 is a data flow diagram showing handover of a user equipment from a serving cell to a target cell where a pointer to an uplink grant is provided to the user equipment.

Reference is now made to FIG. 8, which shows an alternative handover procedure. In particular, in FIG. 8, UE 810 communicates with a serving eNB 812 and a target eNB 814. Serving eNB 812 and target eNB 814 may communicate with each other and may further communicate with MME 816 and SGW 818.

As seen in the embodiment of FIG. 8, the UE sends a measurement report 820 to serving eNB 812, which is the same as the message 620 from FIG. 6.

The serving eNB 812 then performs a handover algorithm at block 822 which is the same as that of block 222 of FIG. 2. Based on the handover, the serving eNB 812 sends a handover request message 824 to the target eNB 814. Message 824 is the same as that of message 624 of FIG. 6.

Target eNB 814 then performs access control at block 826 in a similar manner to that of block 226 of FIG. 2 above and responds with a message 828.

In the embodiment of FIG. 8, message 828 may be an X2AP: HANDOVER REQUEST ACKNOWLEDGEMENT message and is sent to serving eNB 812. The X2AP: HANDOVER REQUEST ACKNOWLEDGEMENT message includes a transparent container to be sent to the UE as an RRC message to perform the handover. The container may include the new C-RNTI, target eNB security algorithm identifiers for the selected security algorithms and may include a dedicated RACH preamble and possibly other parameters. The target eNB generates the RRC message to perform the handover and this may be in the form of an RRCConnectionReconfiguration message and may include mobility control information to be sent by the source eNB to the UE.

Embodiment in which a pointer to an uplink resource grant is carried in the HO Ack.

In the embodiment of FIG. 8, the handover request acknowledgement message may further include information for a downlink subframe in which the uplink grant is expected at the target cell for the incoming UE to send the RRCConnectionReconfigurationComplete message.

Upon receiving message 828 at serving eNB 812, the RRC reconfiguration message 830 is sent to UE 810. As indicated above, the message may include a downlink subframe which may carry the PDCCH to indicate an uplink grant at the target cell for sending the RRCConnectionReconfigurationComplete message.

At this point, downlink data is forwarded to the target eNB 814, as shown by block 840 and the UE 810 further listens to the PDCCH from the target cell as shown by block 850.

In particular, after receiving the RRC reconfiguration message 830 including the mobility control information, if no pointer to an uplink grant is received the UE performs a synchronization to the target eNB 814 and accesses the target cell via RACH, following a contention-free procedure if the dedicated RACH preamble was indicated in the mobility control information or following a contention based procedure if no dedicated preamble was indicated or if the UE searches for a pointer to an uplink grant.

UE 810 derives the target eNB specific keys and configures the selected security algorithms to be used in the target cell. The target eNB 814 responds with an uplink allocation and timing advance.

If the mobility control information contains a pointer to an uplink grant, the UE prepares to transmit the RRCConnectionReconfigurationComplete message during the specified uplink subframe by adjusting its uplink transmit timing based on the downlink reception timing from the serving and target cells. Such adjustment of the timing is shown by block 852. In the embodiment of FIG. 8, the uplink synchronization of block 250 from FIG. 2 is not required.

When the UE has successfully accessed the target cell or has obtained a pointer to an uplink grant, the UE may then send the RRCConnectionReconfigurationComplete message (C-RNTI) to confirm the handover, along with an uplink buffer status report, whenever possible, to the target eNB to indicate that the handover procedure is completed for the UE. The target eNB verifies the C-RNTI is sent in the RRCConnectionReconfigurationComplete message.

Subsequently, a path switch is performed, as shown by block 860 and described above with regard to block 260 of FIG. 2. Subsequently, the UE context release may be sent from target eNB 814 to serving eNB 812, as shown by message 862.

Based on the above, the time for both uplink data interruption 870 and downlink data interruption 872 is reduced through the removal of block 250.

Figure 9:
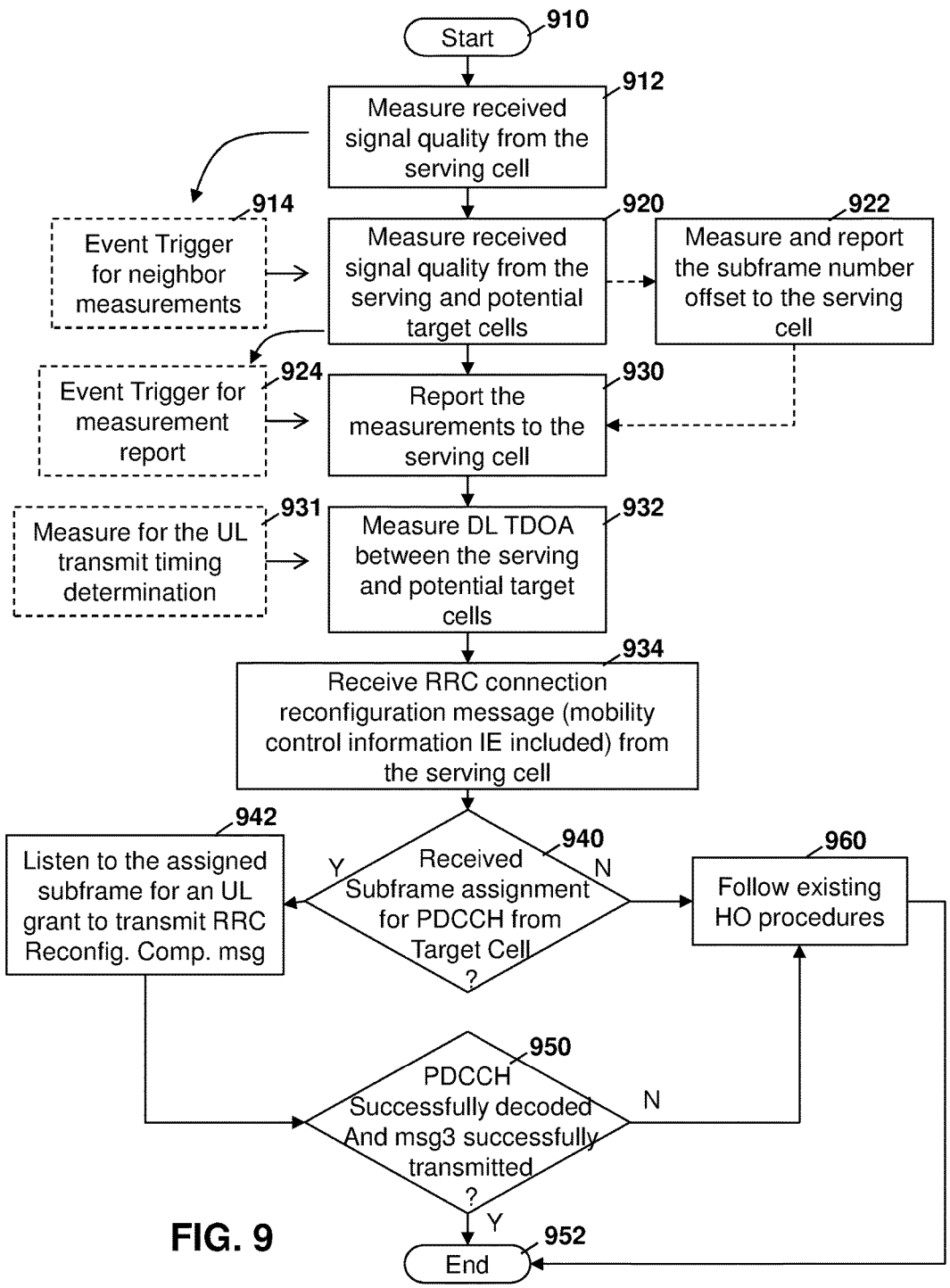
FIG. 9 is a process diagram showing a process at a user equipment for handover to a target cell in accordance with the embodiment of FIG. 8.

Reference is now made to FIG. 9, which illustrates the functionality of the UE according to the above embodiment. When the UE receives the uplink grant on the RRCConnectionReconfiguration message from the serving cell, the UE transmits the RRCConnectionReconfigurationComplete message during the assigned uplink resources to the target cell. If there is no positive acknowledgement for the RRCConnectionReconfigurationComplete message transmission, and the retransmissions are exhausted, the UE may then initiate the RACH procedure with the target cell. For the mobility control information IE in RRCConnectionReconfiguration message, this IE may include RACH preamble sequence assignment along with the uplink grant.

Thus, referring to FIG. 9, the process starts at block 910 and proceeds to block 912 in which the received signal quality is measured from the serving cell. This may trigger an event for the neighbor measurements, as shown by block 914 and the process then proceeds to block 920 in which the received signal quality from the serving cell, as well as potential target cells, is measured.

The process optionally may proceed from block 920 to block 922 to measure and report the subframe number offset to the serving cell. The measurement at block 920 further triggers an event trigger for the measurement report as shown by block 924.

From block 922 or if the optional block 922 is not used, from block 920, the process proceeds to block 930 in which measurements are reported to the serving cell and the process then proceeds to block 932. Further, as seen in FIG. 9, a measure for the uplink transmit timing determination may be also made as shown by block 931 based on the difference of TOA measurements made on the downlink (DL).

At block 932 the UE measures the downlink time difference of arrival between the serving cell and the potential target cells in order to make an uplink transmit timing determination and the process then proceeds to block 934 in which the UE receives the RRCConnectionReconfiguration message which includes the mobility control information element. The message is received from the serving cell at block 934.

The process then proceeds to block 940 in which a check is made to determine whether a subframe assignment for a physical downlink control channel has been received from the target cell. If yes, the process proceeds to block 942 in which the UE listens for the assigned subframe from an uplink grant to transmit the RRC Reconfiguration complete message (message 854 of FIG. 8).

From block 942 the process proceeds to block 950 in which a check is made to determine whether the PDCCH is successfully decoded and the RRC Reconfiguration complete message is successfully transmitted. As will be appreciated, the RRC Reconfiguration complete message is successfully transmitted if an acknowledgement or RAR message is received back at the UE.

If the message is successfully transmitted the process proceeds to block 952 and ends.

Conversely, if a subframe assignment for the PDCCH from the target cell is not received at block 940, or if the PDCCH is not successfully decoded or the RRCConnectionReconfigurationComplete message is not successfully transmitted, the process proceeds to block 960 in which the existing handover methods of FIG. 2 are utilized in order to successfully execute the handover.

From block 960 the process proceeds to block 952 and ends.

In a further embodiment, the serving cell may request the target cell to assign an uplink grant for the incoming UE to send the RRCReconfigurationComplete message to the target cell. In this embodiment, the target cell may indicate a range of subframe numbers which may include a PDCCH for the uplink grant for the incoming UE. Once the serving cell decides to handover the UE, it may select the range of subframes from the tentative subframe allocation received from the target cell and include those subframe numbers in the RRC reconfiguration message to the UE.

Additionally, the same information (i.e., the selected subframe numbers) may also be sent to the target cell. For example, the information may be sent in a new message entitled X2AP: HO REQUEST CONFIRM message to the target cell.

The incoming UE may receive a PDCCH with the allotted C-RNTI in these subframes. The transmission timing is adjusted based on the downlink differential timing between the serving and the target cells. The target cell may transmit the PDCCH with the uplink grant in multiple downlink subframes. For example, the PDCCH transmitted every Nth subframe for a maximum of M transmissions. This ensures that the UE does not miss the PDCCH transmission. The parameters N and M are optimized such that UE detection probability is maximized without overloading the PDCCH capacity.

Figure 10:
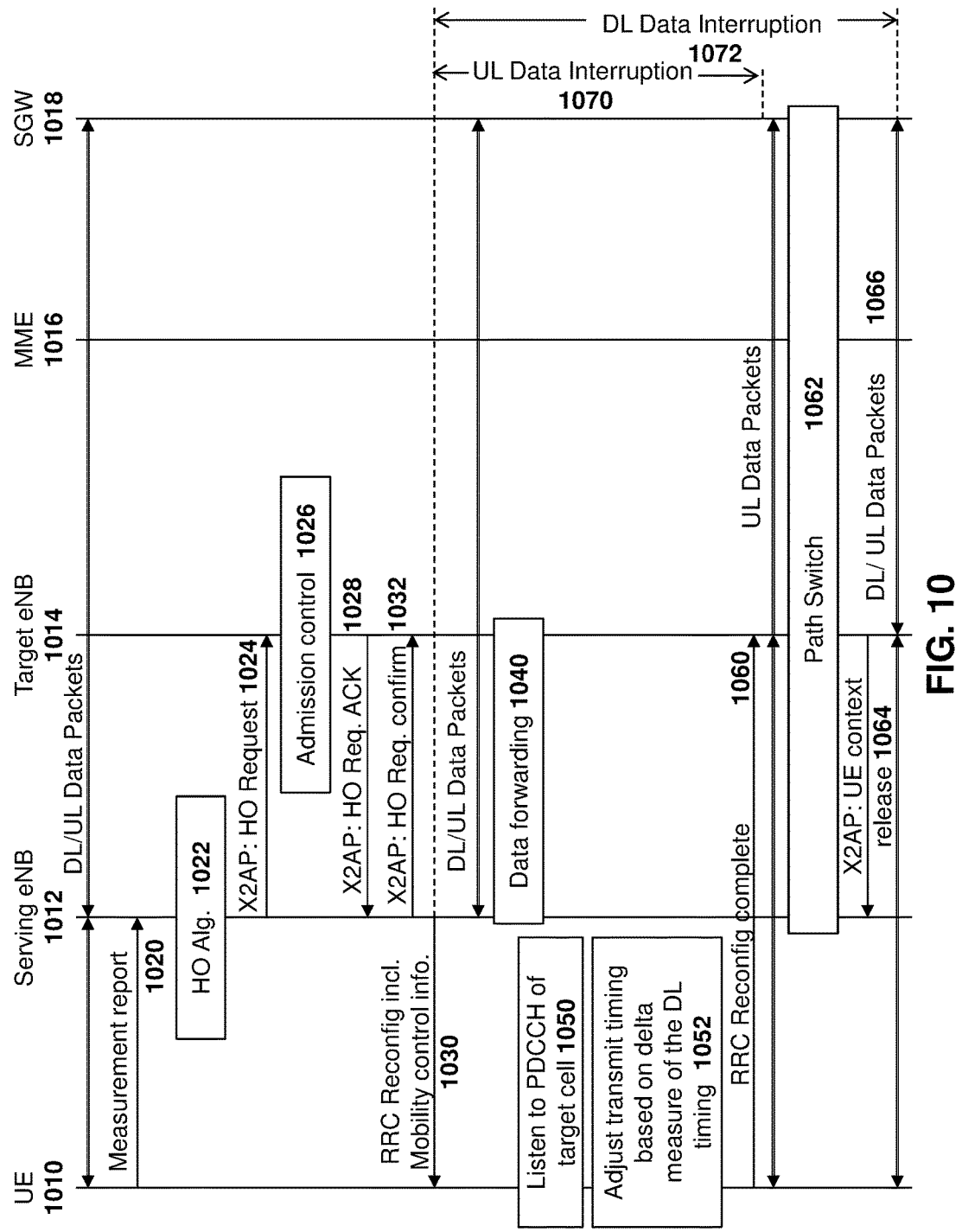
FIG. 10 is a data flow diagram showing handover of a user equipment from a serving cell to a target cell where a range of pointers to an uplink grant is provided from the target cell.

Embodiment in which the serving eNB selects among a set of pointers offered by the target eNB Reference is now made to FIG. 10, which depicts this further embodiment handover procedure.

In particular, in FIG. 10, UE 1010 communicates with serving eNB 1012 and further with target eNB 1014. Serving eNB 1012 and target eNB 1014 may communicate with each other and may further communicate with an MME 1016 and an SGW 1018.

As with FIG. 2 above, UE 1010 sends a measurement report as shown by message 1020 which may trigger a handover algorithm block 1022 at the serving eNB 1012. If the serving eNB 1012 determines in a handover algorithm block that a target eNB 1014 should be used for UE 1010, a handover request 1024 is sent to the target eNB 1014.

Target eNB 1014 then performs admission control at block 1026 in a similar manner to block 226 of FIG. 2 above.

If the target eNB is able to accommodate the UE 1010, an acknowledgement 1028 is sent back to serving eNB 1012. In this regard, target cell prepares handover and sends the acknowledgement to the source cell. The acknowledgement message includes transparent container to be sent to the UE as an RRC message to perform the handover. The container includes the new C-RNTI, target eNB security algorithm identifiers for the selected security algorithms, and may further include a dedicated RACH preamble and other parameters such as access parameters, SIBs, among others. The acknowledgement may also include the RNL/TNL information for the forwarding tunnels if necessary.

An RRC message may be generated by the target eNB 1014 to perform the handover. This includes the mobility control information and may include a range of downlink subframes in which the uplink grant is expected at the target cell for the incoming UE to send the RRCReconfigurationComplete message.

Once serving eNB 1012 receives message 1028, the serving eNB 1012 transmits the RRC reconfiguration message to the UE. Such a message 1030 may include downlink subframes which may carry the PDCCH to indicate an uplink grant at the target cell for sending the RRCConnectionReconfigurationComplete message. The serving cell may select these downlink subframes from the set of subframes tentatively assigned by the target cell in the handover request acknowledgement message 1028.

The serving eNB 1012 may also transmit the assigned downlink selected subframes in a handover request confirm message 1032 directed to target eNB 1014.

As seen in FIG. 10, downlink packets continue to be sent to serving eNB 1012 and are then forwarded to the target eNB 1014, as shown by data forwarding block 1040.

After receiving the RRCConnectionReconfiguration message 1030, which includes the mobility control information, if no pointer to an uplink grant is received the UE may perform synchronization to the target eNB and access the target cell via RACH, following either a contention-free procedure if a dedicated RACH preamble was indicated in the mobility control information, or following a contention based procedure if no target eNB specific keys and configurations were provided. The target eNB responds with uplink allocation and timing advance.

Otherwise, as provided by block 1050 the UE listens to the PDCCH from the target cell and at block 1052 the UE adjusts the timing based on the delta measurement of the downlink timing. The UE may search for pointers to an uplink grant and the UE may derive the target eNB specific keys and configure the selected security algorithms to be used in the target cell.

If the mobility control information contains a pointer to an uplink grant, the UE prepares to transmit the RRCConnectionReconfigurationComplete message 1060 during the specified uplink subframes by adjusting its uplink transmit timing based on the time delay of arrival measurements between the downlink reception timing from the serving and the target cells.

When the UE has successfully accessed the target cell or obtains a pointer to an uplink grant, the UE sends the RRCReconfigurationComplete message 1060 (including C-RNTI) to confirm the handover, along with an uplink buffer status report whenever possible to target eNB 1014 to indicate that the handover procedure is completed for the UE. The target eNB verifies the C-RNTI sent in the RRCConnectionReconfigurationComplete message and may then perform a path switch as shown by block 1062 and may further perform a UE context release with serving eNB 1014, as shown by message 1064.

Subsequent to this, as shown by arrows 1066 the target eNB 1014 becomes the serving eNB and uplink and downlink data packets are sent through the target eNB 1014.

From FIG. 10 above, the handover request confirm message 1032 may be sent just before the message 1030 to ensure that the UE is listening to the appropriate PDCCHs from the target cell.

Based on the above, the time for both uplink data interruption 1070 and downlink data interruption 1072 is reduced through the removal of block 250.

The macro eNB and small cell eNBs may be implemented using any network element. A simplified network element is shown with regard to FIG. 11.

Figure 11:
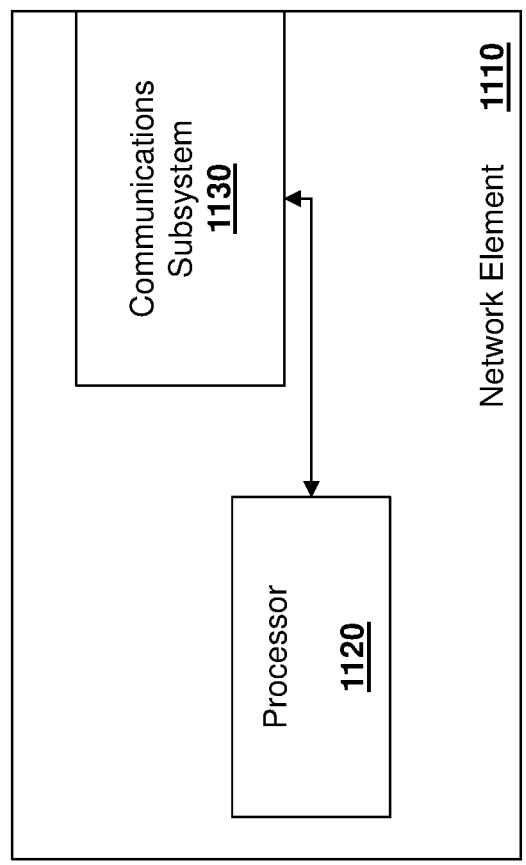
FIG. 11 is a block diagram of a simplified network element.

In FIG. 11, network element 1110 includes a processor 1120 and a communications subsystem 1130, where the processor 1120 and communications subsystem 1130 cooperate to perform the methods described above.

Further, the above may be implemented by any UE. One exemplary device is described below with regard to FIG. 12.

UE 1200 is typically a two-way wireless communication device having voice and data communication capabilities. UE 1200 generally has the capability to communicate with other computer systems. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 1200 is enabled for two-way communication, it may incorporate a communication subsystem 1211, including both a receiver 1212 and a transmitter 1214, as well as associated components such as one or more antenna elements 1216 and 1218, local oscillators (LOs) 1213, and a processing module such as a digital signal processor (DSP) 1220. As will be apparent to those skilled in the field of communications, the particular design of the communication subsystem 1211 will be dependent upon the communication network in which the device is intended to operate. The radio frequency front end of communication subsystem 1211 can be any of the embodiments described above.

Network access requirements will also vary depending upon the type of network 1219. In some networks network access is associated with a subscriber or user of UE 1200. A UE may require a removable user identity module (RUIM) or a subscriber identity module (SIM) card in order to operate on a network. The SIM/RUIM interface 1244 is normally similar to a card-slot into which a SIM/RUIM card can be inserted and ejected. The SIM/RUIM card can have memory and hold many key configurations 1251, and other information 1253 such as identification, and subscriber related information.

Figure 12:
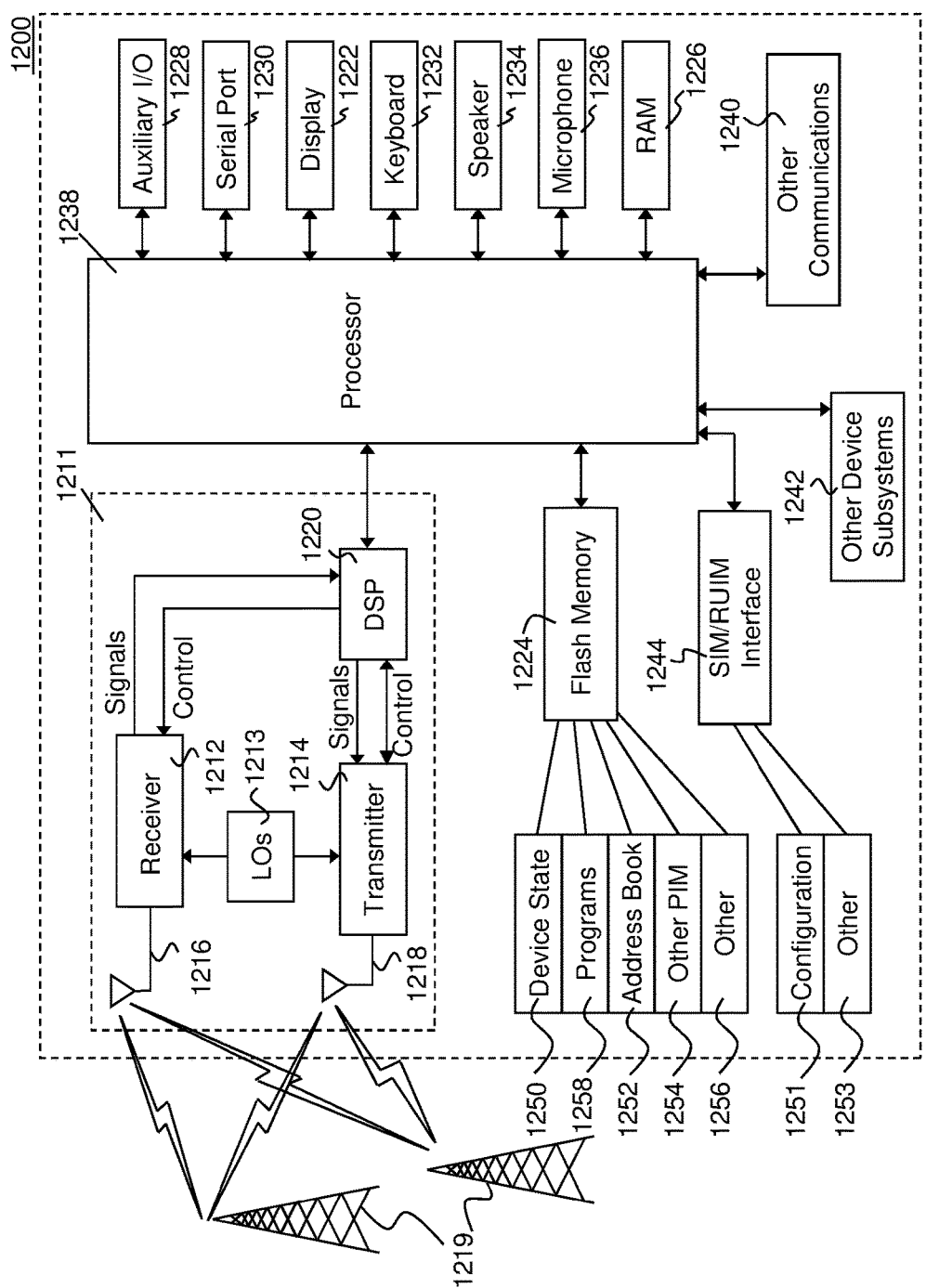
FIG. 12 is a block diagram of an example user equipment.

When required network registration or activation procedures have been completed, UE 1200 may send and receive communication signals over the network 1219. As illustrated in FIG. 12, network 1219 can consist of multiple base stations communicating with the UE. These can include base stations for macro cells and assisted serving cells or small cells in accordance with the embodiments described above.

Signals received by antenna 1216 through communication network 1219 are input to receiver 1212, which may perform such common receiver functions as signal amplification, frequency down conversion, filtering, channel selection and the like. A/D conversion of a received signal allows more complex communication functions such as demodulation and decoding to be performed in the DSP 1220. In a similar manner, signals to be transmitted are processed, including modulation and encoding for example, by DSP 1220 and input to transmitter 1214 for digital to analog conversion, frequency up conversion, filtering, amplification and transmission over the communication network 1219 via antenna 1218. DSP 1220 not only processes communication signals, but also provides for receiver and transmitter control. For example, the gains applied to communication signals in receiver 1212 and transmitter 1214 may be adaptively controlled through automatic gain control algorithms implemented in DSP 1220.

UE 1200 generally includes a processor 1238 which controls the overall operation of the device. Communication functions, including data and voice communications, are performed through communication subsystem 1211. Processor 1238 also interacts with further device subsystems such as the display 1222, flash memory 1224, random access memory (RAM) 1226, auxiliary input/output (I/O) subsystems 1228, serial port 1230, one or more keyboards or keypads 1232, speaker 1234, microphone 1236, other communication subsystem 1240 such as a short-range communications subsystem and any other device subsystems generally designated as 1242. Serial port 1230 could include a USB port or other port known to those in the art.

Some of the subsystems shown in FIG. 12 perform communication-related functions, whereas other subsystems may provide "resident" or on-device functions. Notably, some subsystems, such as keyboard 1232 and display 1222, for example, may be used for both communication-related functions, such as entering a text message for transmission over a communication network, and device-resident functions such as a calculator or task list.

Operating system software used by the processor 1238 may be stored in a persistent store such as flash memory 1224, which may instead be a read-only memory (ROM) or similar storage element (not shown). Those skilled in the art will appreciate that the operating system, specific device applications, or parts thereof, may be temporarily loaded into a volatile memory such as RAM 1226. Received communication signals may also be stored in RAM 1226.

As shown, flash memory 1224 can be segregated into different areas for both computer programs 1258 and program data storage 1250, 1252, 1254 and 1256. These different storage types indicate that each program can allocate a portion of flash memory 1224 for their own data storage requirements. Processor 1238, in addition to its operating system functions, may enable execution of software applications on the UE. A predetermined set of applications that control basic operations, including at least data and voice communication applications for example, will normally be installed on UE 1200 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 1219. Further applications may also be loaded onto the UE 1200 through the network 1219, an auxiliary I/O subsystem 1228, serial port 1230, short-range communications subsystem 1240 or any other suitable subsystem 1242, and installed by a user in the RAM 1226 or a non-volatile store (not shown) for execution by the processor 1238. Such flexibility in application installation increases the functionality of the device and may provide enhanced on-device functions, communication-related functions, or both. For example, secure communication applications may enable electronic commerce functions and other such financial transactions to be performed using the UE 1200.

In a data communication mode, a received signal such as a text message or web page download will be processed by the communication subsystem 1211 and input to the processor 1238, which may further process the received signal for output to the display 1222, or alternatively to an auxiliary I/O device 1228.

A user of UE 1200 may also compose data items such as email messages for example, using the keyboard 1232, which may be a complete alphanumeric keyboard or telephone-type keypad, among others, in conjunction with the display 1222 and possibly an auxiliary I/O device 1228. Such composed items may then be transmitted over a communication network through the communication subsystem 1211.

For voice communications, overall operation of UE 1200 is similar, except that received signals would typically be output to a speaker 1234 and signals for transmission would be generated by a microphone 1236. Alternative voice or audio I/O subsystems, such as a voice message recording subsystem, may also be implemented on UE 1200. Although voice or audio signal output is generally accomplished primarily through the speaker 1234, display 1222 may also be used to provide an indication of the identity of a calling party, the duration of a voice call, or other voice call related information for example.

Serial port 1230 in FIG. 12 would normally be implemented in a personal digital assistant (PDA)-type UE for which synchronization with a user's desktop computer (not shown) may be desirable, but is an optional device component. Such a port 1230 would enable a user to set preferences through an external device or software application and would extend the capabilities of UE 1200 by providing for information or software downloads to UE 1200 other than through a wireless communication network. The alternate download path may for example be used to load an encryption key onto the device through a direct and thus reliable and trusted connection to thereby enable secure device communication. As will be appreciated by those skilled in the art, serial port 1230 can further be used to connect the UE to a computer to act as a modem.

Other communications subsystems 1240, such as a short-range communications subsystem, is a further optional component which may provide for communication between UE 1200 and different systems or devices, which need not necessarily be similar devices. For example, the subsystem 1240 may include an infrared device and associated circuits and components or a Bluetooth™ communication module to provide for communication with similarly enabled systems and devices. Subsystem 1240 may further include non-cellular communications such as WiFi, WiMAX, or near field communications (NFC).

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

In particular, sample clauses are shown below.

AA. A user equipment adapted for handover from a serving cell to a target cell, the user equipment comprising a processor configured to: send a measurement report to the serving cell; and transmit a reconfiguration complete message to the target cell; wherein the measurement report includes downlink timing measurements for the target cell.

BB. The user equipment of clause AA, wherein the processor is further configured to: receive a reconfiguration message from the serving cell, the reconfiguration message including an uplink grant or at least one downlink subframe to receive the uplink grant from the target cell.

CC. The user equipment of clause BB, wherein the reconfiguration message includes a timing advance value for the target cell.

DD. The user equipment of clause AA, wherein the user equipment is configured to transmit by adjusting uplink transmit timing at the user equipment based on downlink reception timing differences between the serving cell and the target cell.

EE. The user equipment of clause BB, wherein at least one downlink subframe is a downlink control channel subframe indicating the uplink grant at the target cell.

FF. The user equipment of clause AA, wherein the processor is further configured to receive a response from the target cell based on the transmitting the reconfiguration complete message.

GG. The user equipment of clause FF, wherein if no response is received, the processor is configured to retransmit the reconfiguration complete message at a higher power.

HH. The user equipment of clause GG, wherein if a maximum number of retransmissions is reached, the processor is configured to perform a random access procedure for uplink synchronization with the target cell.

II. The user equipment of clause AA, wherein the uplink grant contains a subframe number.

JJ. A source network element for handover of a user equipment from the source network element to a target network element, the source network element comprising a processor configured to: receive a measurement report from the user equipment; send a handover request to the target network element, the handover request including a request for an uplink grant at the target network element for the user equipment to send a reconfiguration complete message; receive a handover request acknowledgement including a reconfiguration message and the uplink grant; and forward the reconfiguration message and uplink grant to the user equipment.

KK. The source network of clause JJ, wherein the measurement report includes downlink timing measurements for the target cell.

LL. The source network of clause JJ, wherein the reconfiguration message includes a timing advance value for the target cell.

MM. A method at a source network element for handover of a user equipment from the source network element to a target network element, the method comprising: receiving a measurement report from the user equipment; sending a handover request to the target network element; receiving a handover request acknowledgement from the target network element, the handover request acknowledgement including a reconfiguration message and at least one downlink subframe in which an uplink grant is expected at the target network element for the user equipment; and forwarding the reconfiguration message and at least one downlink subframe to the user equipment.

NN. The method of clause MM, wherein the measurement report includes downlink timing measurements for the target cell.

OO. The method of clause MM, wherein the reconfiguration message includes a timing advance value for the target cell.

PP. The method of clause MM, wherein the receiving includes a range of downlink subframes, and wherein the forwarding provides the user equipment with a subset of downlink subframes within the range of downlink subframes.

QQ. The method of clause PP, wherein the source network element chooses the subset of downlink subframes within the range of downlink subframes.

RR. The method of clause QQ, further comprising sending a confirmation message to the target network element with the subset of downlink subframes.

SS. The method of clause RR, wherein the sending the confirmation is done just prior to the forwarding the reconfiguration message.

TT. The method of clause MM, wherein the at least one downlink subframe for the uplink grant is a downlink control channel subframe indicating the uplink grant at the target cell.

The invention claimed is:

1. A method at a user equipment for handover from a serving cell to a target cell, the method comprising:
   measuring, at the user equipment, a difference between downlink times of arrival for the target cell and the serving cell;
   sending to the serving cell the difference between downlink times of arrival for the target cell and the serving cell;
   sending to the target cell adjustments to uplink transmit timing at the user equipment based on the difference between downlink times of arrival for the target cell and the serving cell;
   receiving a response from the target cell; and
   if no response is received, resending the adjustments to uplink transmit timing at the user equipment to the target cell.

2. The method of claim 1, further comprising, receiving a reconfiguration message from the serving cell, the reconfiguration message including an uplink grant or at least one downlink subframe to receive the uplink grant from the target cell.

3. The method of claim 2, wherein the reconfiguration message includes a timing advance value for the target cell.

4. The method of claim 1 further comprising adjusting uplink transmit timing at the user equipment based on the difference between downlink times of arrival for the target cell and the serving cell.

5. The method of claim 2, wherein at least one downlink subframe is a downlink control channel subframe indicating the uplink grant at the target cell.

6. The method of claim 1, wherein if a maximum number of retransmissions is reached, performing random access procedure for uplink synchronization with the target cell.

7. The method of claim 2, wherein the uplink grant contains a subframe number.

8. A method at a source network element for handover of a user equipment from the source network element to a target network element, the method comprising:
receiving, from the user equipment, differences between downlink times of arrival for the source network element and the target network element measured by the user equipment;
sending a handover request to the target network element;
receiving a handover request acknowledgement including at least one downlink subframe in which an uplink grant is expected at the target network element for the user equipment; and
forwarding the at least one downlink subframe to the user equipment.

9. The method of claim 8, wherein the handover request acknowledgement includes a timing advance value for the target network element.

10. A source network element for handover of a user equipment from the source network element to a target network element, the source network element comprising a processor configured to:
receive, from the user equipment, differences between downlink times of arrival for the source network element and the target network element measured by the user equipment;
send a handover request to the target network element;
receive a handover request acknowledgement including at least one downlink subframe in which an uplink grant is expected at the target network element for the user equipment; and
forward the at least one downlink subframe to the user equipment.

11. The source network element of claim 10, wherein the handover request acknowledgment includes a timing advance value for the target network element.

12. The source network element of claim 10, wherein the source network element is configured to receive a range of downlink subframes, and forward by providing the user equipment with a subset of downlink subframes within the range of downlink subframes.

13. The source network element of claim 12, wherein the source network element chooses the subset of downlink subframes within the range of downlink subframes.

14. The source network element of claim 13, wherein the source network element is further configured to send a confirmation message to the target network element with the subset of downlink subframes.

15. The source network element of claim 10, wherein the at least one downlink subframe for the uplink grant is a downlink control channel subframe indicating the uplink grant at the target network element.

* * * * *